United States Patent
Cramer et al.

(10) Patent No.: US 6,920,580 B1
(45) Date of Patent: Jul. 19, 2005

(54) NEGOTIATED GRACEFUL TAKEOVER IN A NODE CLUSTER

(75) Inventors: Samuel M. Cramer, Sunnyvale, CA (US); Scott Schoenthal, San Ramon, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 555 days.

(21) Appl. No.: 09/933,883

(22) Filed: Aug. 20, 2001

Related U.S. Application Data (63) Continuation-in-part of application No. 09/625,234, filed on Jul. 25, 2000, now Pat. No. 6,728,897.

(51) Int. Cl.[7] ................................................ G06F 11/07
(52) U.S. Cl. ................................. 714/4; 714/6; 714/24
(58) Field of Search ................................ 714/4, 5, 6, 7, 714/24

(56) References Cited

U.S. PATENT DOCUMENTS

| | | |
|---|---|---|
| 4,937,763 A | 6/1990 | Mott |
| 5,067,099 A | 11/1991 | McCown et al. |
| 5,157,663 A | 10/1992 | Major et al. |
| 5,163,131 A | 11/1992 | Row et al. |
| 5,355,453 A | 10/1994 | Row et al. |
| 5,485,579 A | 1/1996 | Hitz et al. |
| 5,633,999 A | 5/1997 | Clowes et al. |
| 5,717,934 A * | 2/1998 | Pitt et al. ................ 714/24 |
| 5,781,770 A | 7/1998 | Byers et al. |
| 5,802,366 A | 9/1998 | Row et al. |
| 5,812,748 A * | 9/1998 | Ohran et al. ............. 714/4 |
| 5,812,751 A * | 9/1998 | Ekrot et al. .............. 714/4 |
| 5,819,292 A | 10/1998 | Hitz et al. |
| 5,931,918 A | 8/1999 | Row et al. |
| 5,941,972 A | 8/1999 | Hoese et al. |
| 5,951,695 A | 9/1999 | Kolovson |
| 5,963,962 A | 10/1999 | Hitz et al. |
| 5,987,621 A * | 11/1999 | Duso et al. ................ 714/4 |
| 6,065,037 A | 5/2000 | Hitz et al. |
| 6,119,244 A | 9/2000 | Schoenthal et al. |
| 6,289,356 B1 | 9/2001 | Hitz et al. |
| 6,292,905 B1 | 9/2001 | Wallach et al. |
| 6,317,844 B1 | 11/2001 | Kleiman |
| 6,425,035 B2 | 7/2002 | Hoese et al. |
| 6,560,617 B1 * | 5/2003 | Winger et al. ............ 714/4 |
| 6,625,749 B1 | 9/2003 | Quach |
| 6,728,897 B1 | 4/2004 | Cramer et al. |
| 6,775,702 B2 | 8/2004 | Oeda et al. |

FOREIGN PATENT DOCUMENTS

| | | | |
|---|---|---|---|
| EP | 0537098 A2 | 4/1993 | |
| WO | WO 200011553 A1 * | 3/2000 | ............. G06F/3/00 |

OTHER PUBLICATIONS

Anupam Bhide, Elmootazebellah H. Elnozahy, Stephen P. Morgan, "A Highly Available Network File Server," Proceedings of the Winter 1991 Usenix Conference, Jan. 21–25, 1991, pp. 199–205.

* cited by examiner

Primary Examiner—Robert Beausoliel
Assistant Examiner—Joseph D Manoskey
(74) Attorney, Agent, or Firm—Cesari and McKenna, LLP (57) ABSTRACT

The invention is a method for operating a file server system in a cluster mode that provides for relatively rapid and reliable takeover of a failed file server in the cluster by a partner file server when the failed file server has detected a fault that will cause it to shut down. This is done by the failed file server requesting the one file server to take over its file services after detecting the fault in its operations, the one file server letting the failed file server complete existing file service requests from clients, refusing further file service requests addressed to the failed file server, and the one file server taking over by transferring file service requests to the one file server. As part of this takeover the one file server takes on the identity of the failed filer and activates network interfaces and network addresses that replicate the failed server's network addresses.

44 Claims, 5 Drawing Sheets

NEGOTIATED GRACEFUL TAKEOVER IN A NODE CLUSTER

RELATED APPLICATIONS

This is a Continuation-In-Part application of U.S. patent application Ser. No. 09/625,234 entitled NEGOTIATING TAKEOVER IN HIGH AVAILABILITY CLUSTER, filed Jul. 25, 2000, now U.S. Pat. No. 6,728,897, issued on Apr. 27, 2004. This application is related to copending U.S. patent application Ser. No. 09/933,866 entitled OPERATOR INITIATED GRACEFUL TAKEOVER IN A NODE CLUSTER, filed Aug. 20, 2001.

FIELD OF THE INVENTION

The present invention relates to networks and more particularly to takeovers by one server of another server in a cluster of servers on a network.

BACKGROUND OF THE INVENTION

A storage system, such as a file server, is a special-purpose computer that provides file services relating to the organization of information on storage devices, such as hard disks. A file server ("filer") includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored. An example of a file system that is configured to operate on a filer is the Write Anywhere File Layout (WAFL™) file system available from Network Appliance, Inc., Sunnyvale, Calif.

As used herein, the term "storage operating system" generally refers to the computer-executable code operable on a storage system that implements file system semantics and manages data access. In this sense the Data ONTAP™ storage operating system with its WAFL file system, available from Network Appliance, Inc., is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

A filer cluster is organized to include two or more filers and two or more storage "volumes" that comprise a cluster of physical storage disks, defining an overall logical arrangement of storage space. Currently available filer implementations can serve a large number of volumes. Each volume is generally associated with its own file system. The disks within a volume/file system are typically organized as one or more groups of Redundant Array of Independent (or Inexpensive) Disks (RAID). RAID 4 implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed and is preferred. This implementation specifically entails the striping of data bits across a group of disks, and separate parity caching within a selected disk of the RAID group.

It is advantageous for the services and data provided by a storage system to be available for access to the greatest degree possible. Accordingly, some computer storage systems provide a plurality of filers in a cluster, with the property that when a first filer fails, a second filer is available to takeover and provide the services and the data otherwise provided by the first filer. The second filer provides these services and data by a "takeover" of resources otherwise managed by the failed first filer.

When two filers in a cluster provide backup for each other it is important that the filers be able to reliably detect failure(s) in their operations and to handle any required takeover operations. It would be advantageous for this to occur without either of the two filers interfering with proper operation of the other filer. To implement these operations each filer has a number of modules that monitor different aspects of its operations. A failover monitor is also used to gather information from the individual modules and determine the operational health of the portion of the filer that is being monitored by each module. All the gathered information is preferably stored in persistent memory, such as a non-volatile random access memory (NVRAM), of both the filer in which the monitor and modules are located, and in the NVRAM of the partner filer. The gathered information is "mirrored" on the partner's NVRAM by sending the information over a dedicated, high-speed, communication channel or "cluster interconnect" (e.g. Fibre Channel) between the filers.

Upon takeover of a failed filer, the partner filer asserts disk reservations to take over responsibility of the disks of the failed filer, and then sends a series of "please die" commands to the failed filer. After a takeover by a partner filer from a failed filer, the partner handles both file service requests that have normally been routed to it from clients plus file service requests that had previously been handled by the failed filer and that are now routed to the partner.

Subsequently, after correction of the failure, the "failed" filer is rebooted and resumes normal operation. That is, after the problem that caused filer failure has been cured, the failed filer is rebooted, returned to service, and file service requests are again routed to the rebooted filer. If there is a problem with the failed filer that prevents it from being rebooted, or there is a problem with other equipment to which with the failed filer is connected that prevent the rebooted filer from going back online and handling file service requests, the filer remains offline until the other problems are repaired.

With the takeover described above, the failed filer does not shut down "cleanly" and all services of the failed filer are not terminated in an orderly fashion. This includes terminating client connections to the failed filer without completing existing service requests thereto. In addition, there is usually some data remaining in the NVRAM of the failed filer that is "not flushed" and stored to hard disk, and the partner has to re-execute access requests of the failed filer. This can adversely impact system performance.

SUMMARY OF THE INVENTION

The present invention provides a storage system having a plurality of filers connected in a cluster configuration, and a method for operating the system that provides a negotiated takeover of a failed filer by a partner filer that occurs in an orderly, graceful fashion; wherein the takeover is accomplished by the partner filer responsive to a takeover request by the failed filer, and wherein client file service requests being processed by the failed filer are completed before takeover is completed. The invention thus permits a failed filer to be gracefully taken over by a partner and thereby minimizes problems caused to clients.

As used herein, a filer in a cluster configuration "fails" or becomes "impaired" when it loses the ability, e.g., to read a portion of data from mass storage (e.g., disks) that it should be able to read, but is nonetheless able to communicate with other nodes in the cluster, including its cluster partner. Thus, the touchstone of such failure is the continued ability to communicate in the cluster despite loss of some functionality or performance. This can also be called "soft failure" to distinguish from "hard failure," which occurs when the filer becomes unable to communicate with other nodes in the cluster, for example, upon loss of electrical power.

In accordance with the invention, each filer has a number of software modules that monitor different aspects of its operations, and a failover monitor that is used to gather and analyze information from the modules to determine the operational health of the portions of the filer that are being monitored. The failover monitor includes a negotiated fail over (NFO) infrastructure.

In response to a detected failure, the failed filer requests its partner to take over its operations by issuing a "please takeover" command to its partner over the cluster interconnect. In addition, the failed filer informs its partner of the nature of the failure it has experienced. If the partner filer decides to take over the file server operations of the failed filer, the partner issues a "please shutdown" command to the failed filer over a dedicated link between the filers. If the partner filer is also experiencing problems it may decide not to issue the "please shutdown" command to the failed filer. Responsive to the "please shutdown" command a failed filer does not immediately shutdown, but rather "gracefully" shuts down to avoid causing problems with clients accessing the failed filer.

Existing file service requests being processed are completed, non-processed file service requests are stored in persistent memory of both the failed filer and its partner, which preferably may be NVRAM in both the failed filer and its partner, and the failed filer ceases accepting new requests for file services. As part of the graceful shutdown, the failed filer may notify its clients that the filer connection is terminating to give the clients time to disconnect in an orderly manner. In addition, any information needed to process stored service requests not processed by the failed filer before shutdown, such as current state of the failed filer that the failed filer has stored in the persistent memory, is provided to its the partner to be used for processing the unprocessed service requests.

In response to the "please shutdown" command, a countdown timer is started in the partner filer. When the failed filer has completed existing file service requests during the countdown period, the failed filer shuts down. Then, the partner detects the shut down and asserts "disk reservations" to take over responsibility of the disks of the failed filer. In the event that the failed filer has not shut down by the end of the countdown period, the partner sends a "takeover" command to the failed filer over a communication link (e.g. cluster interconnect), thereby forcing it to shut down. The partner also takes over responsibility of the disks of the failed filer.

Once the failed filer has shut down gracefully or has been forced to shut down at the end of the countdown period, the partner takes over the operations of the failed filer. With the failed filer being out of service, file service requests from clients are rerouted to the partner. The partner filer uses the filer state information provided and stored in both the persistent memory of the failed filer and partner to take over the file services of the failed filer. In addition, the partner may in some implementations periodically sends "please die" commands to the failed filer so that it does not try to restore itself to service without a graceful return of service from the partner. After any problems are cured, the failed filer can be rebooted and control can be returned to the restored filer.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The teaching of this invention can be adapted to a variety of storage system architectures including, but not limited to, a network-attached storage environment, a storage area network and disk assemblies directly-attached to a client/host computer. The term "storage system" should therefore be taken broadly to include such arrangements. It is expressly contemplated that the various processes, architectures and procedures described herein can be implemented in hardware, firmware or software, consisting of a computer-readable medium including program instructions that perform a series of steps. However, it should be understood that the teaching of this invention can be applied to any server systems.

Figure 1:
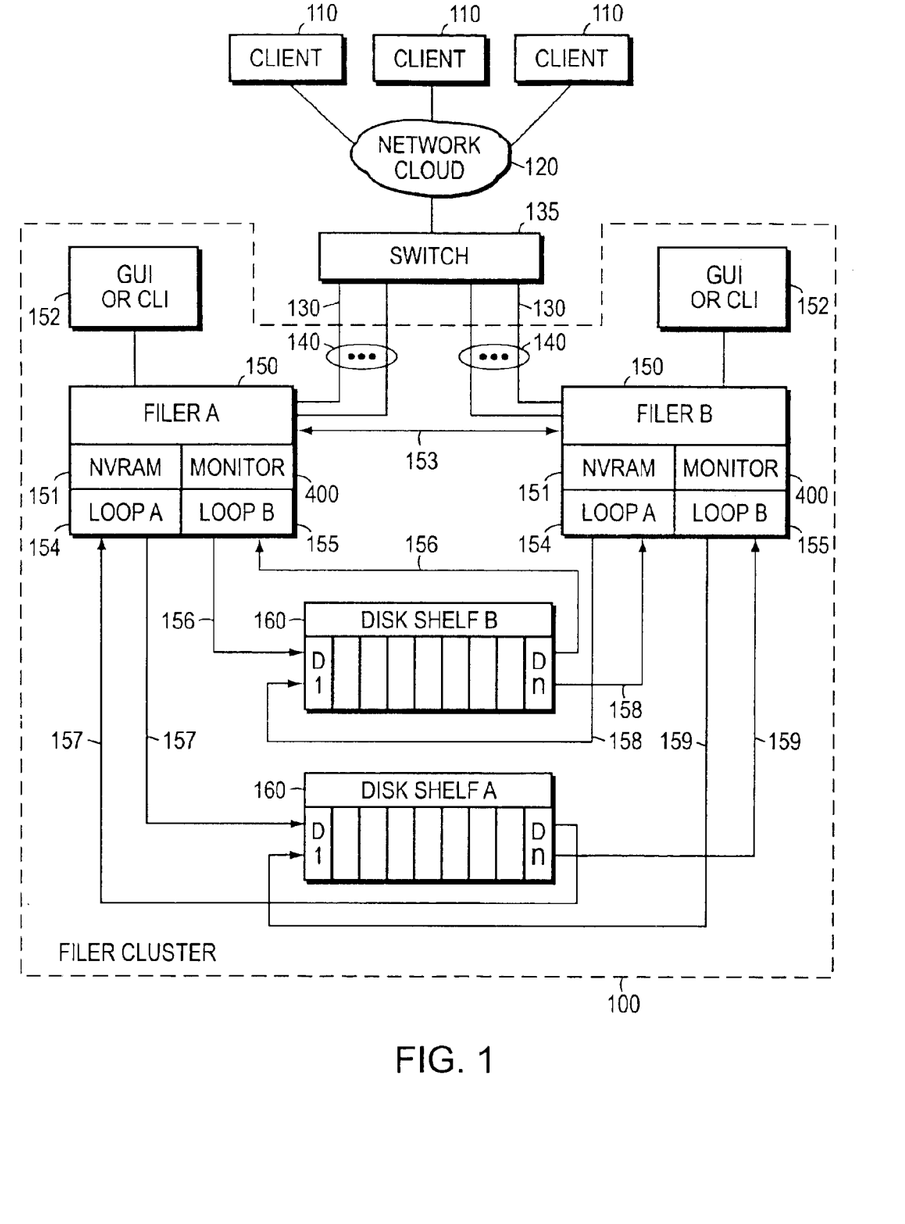
FIG. 1 is a block diagram of two filers connected in a cluster configuration so one filer takes over for the other filer when one of them experiences a problem.

FIG. 1 is a block diagram of two filers designated filer A 150 and filer B 150 connected as two nodes in a filer cluster 100 as shown. In accordance with the teaching of the invention, filer A and filer B provide takeover protection to each other when one fails. It should be understood that while only two filers and two disk shelves are shown in the cluster configuration shown in FIG. 1, this has been done solely for the sake of brevity and multiple filers and disk shelves may be connected in a cluster configuration and provide takeover for each other. Further, there may be more than one RAID group and multiple volumes within multiple RAID groups associated with each filer. In this description the terms filer, file server and storage system are used synonymously. In FIG. 1 filers A & B are preferably file servers configured to provide file services relating to the organization of information on storage devices, such as hard disks D1–Dn in disk shelves A & B 160.

A client 10 may be a general-purpose computer, such as a PC or a workstation, configured to execute applications over an operating system that include file system protocols. Moreover, each client 110 will interact with a filer 150 in accordance with a client/server model of information delivery. That is, a client 110 will request the services of a filer 150, for example, to retrieve files. Clients 110 access filers 150 in cluster 100 via network cloud 120, switch 135 and physical communication links 130 that may be arranged in aggregates or bundles 140.

Clients typically communicate with filers over a network using a known file system protocol consistent with the operating system running on the clients. The Network File System (NFS) is a file system protocol for accessing filers in a UNIX environment. The Common Internet File System (CIFS) is an open standard, connection oriented protocol providing remote file access over a network and is used with filers to provide service to PCs in a Windows environment. Accordingly, CIFS is widely used with servers, such as filers, that have PC clients accessing them.

In the following paragraphs the description is often singularly referenced to filer A or B, but it should be kept in mind that the description also applies to the other filer.

As part of a cluster operation, filers A & B have primarily assigned to each of them a disk shelf 160 comprised of hard disk storage devices D1–Dn that operate in a manner well known in the art. The filers are controlled by a storage operating system, which may preferably be the Data ONTAP™ storage operating system available from Network Appliance, Inc that is optimized to provide filer services. To understand the failover operation described further in this specification, it is important to understand that filers A & B access both disk shelves A and B. Filer A accesses its disk shelf A via loop A 154, through a transmission medium 157, and accesses disk shelf B via loop B 155 through a transmission medium 156. Similarly, filer B has primarily assigned to it a disk shelf B that it accesses via its loop A 154, through a transmission medium 158, and accesses disk shelf A via its loop B 154, through a transmission medium 159. This joint access is necessary for a partner filer to access a failed filer's disk shelf to continue providing file services to the clients of the failed filer after a takeover.

To implement a takeover in the event of failure of a filer, there is a communication link between filers A & B that operates in a peer-to-peer capacity across one or more communication links, such as cluster interconnect 153. The cluster interconnect can utilize any communication medium and protocol including a Fibre Channel and a Server Net Fail-over link, both of which are commonly known in the industry. Fibre Channel is the general name of an integrated set of standards used for apparatus to quickly transfer data between all types of hardware in the computer industry. Filers A and B each have a conventional Graphical User Interface (GUI) or Command Line Interface (CLI) 152 that provide a manual interface to the filer cluster 100 for a system operator.

Each filer has a failover monitor 400 that continuously checks and records the status of hardware and software associated with the filer. This information is kept in NVRAM 151 in each filer. More details of the operation of a failover monitor are described in this specification with reference to FIG. 4. Other persistent storage means or a removable storage media may also be used instead of NVRAM.

As part of this takeover, the partner takes on two identities: its own identity and the identity of the failed partner. In addition, the partner also activates network interfaces and network addresses that replicate the failed filer's network addresses. The identity and replicated network interfaces and network addresses are used until the failed filer is restored and control is returned to it. When the restored filer restarts after a system failure or power loss, it replays any access requests in its NVRAM that have not been flushed and stored on hard disk.

Figure 2:
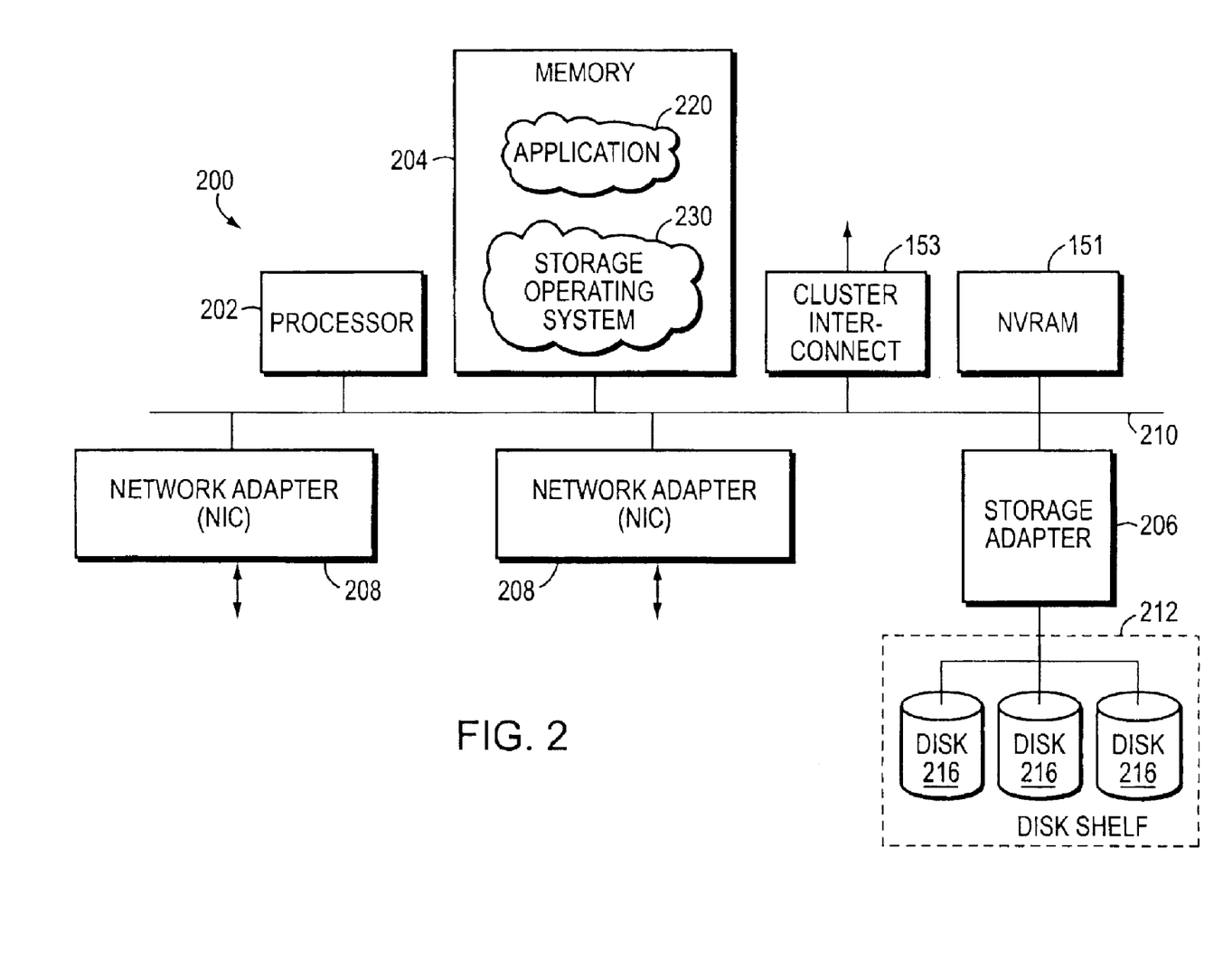
FIG. 2 is a block diagram of a filer that may be used with the present invention.

FIG. 2 is a block diagram of filer 200 comprising a processor 202, cluster interconnect 153, NVRAM 151, a memory 204 that may store an application 220, a storage adapter 206 and at least one network adapter 208 all interconnected by a system bus 210, which is preferably a conventional peripheral computer interconnect (PCI) bus. Storage adapter 206 is connected to disks 216 via a Fibre Channel link. The filer also includes storage operating system 230 stored in memory 204 that implements a file system to logically organize information stored as a hierarchical structure of directories and files on the disks in an assigned disk shelf 212. Disks in the disk shelf are typically organized as a RAID 4 (Redundant Arrays of Inexpensive Disks) array to protect against data loss caused by disk failure in a manner well known in the art. RAID arrays also improve data availability because a filer can continue operation even with a single failed disk.

Storage adapter 206 cooperates with storage operating system 230 executing on processor 202 to access stored information requested by a client 10, which information is stored on hard disks 216. Storage adapter 206 includes input/output (I/O) interface circuitry that couples to the disks 216 over an I/O interconnect arrangement, such as a conventional high-performance, Fibre Channel serial link topology (not shown). Storage adapter 206 retrieves the stored information and it is processed, if necessary, by processor 202 (or storage adapter 206 itself) prior to being forwarded over system bus 210 to a network adapter 208, where the information is formatted into packets and returned via a network (not shown) to a client 110 (not shown in FIG. 2) that requested the information.

Each network adapter in FIG. 2 may comprise a network interface card (NIC) having the necessary mechanical, electrical and signaling circuitry needed to connect a filer to a network node switch (not shown) via the physical communication links 130 shown in FIG. 1.

Figure 3:
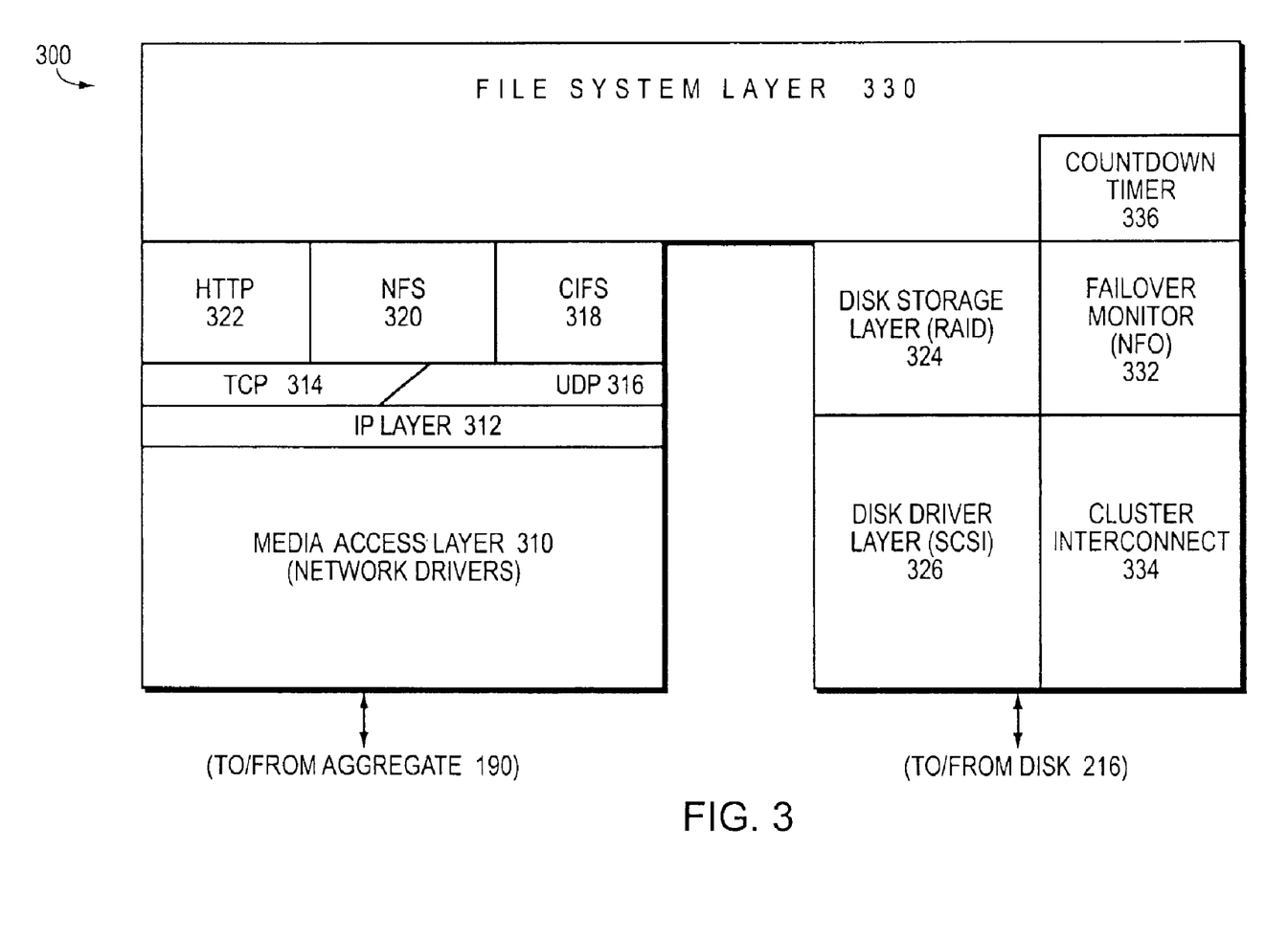
FIG. 3 is a block diagram of a storage operating system that may advantageously be used with the filers of the present invention.

FIG. 3 is a block diagram of the Data ONTAP storage operating system 300 available from Network Appliance, Inc. that is preferably used in implementing the invention. Storage operating system 300 implements the specialized file server operations of the Data ONTAP storage operating system on each filer. The storage operating system comprises a series of software layers, including a media access layer 310 of network drivers (e.g., an Ethernet NIC driver) that function with network adapters 208 in FIG. 2. Storage operating system 300 further includes network protocol layers, such as the IP layer 312 and its supporting transport mechanisms, the Transport Control Protocol (TCP) layer 314, and the User Datagram Protocol (UDP) layer 316. A file system protocol layer includes support for the Common Interface File System (CIFS) protocol 318, the Network File System (NFS) protocol 320 and the Hypertext Transfer Protocol (HTTP) protocol 322. In addition, the storage operating system includes a disk storage layer 324 that implements a disk storage protocol, such as the Redundant Array of Independent Disks (RAID 4) protocol 324, and a disk driver layer 326 that implements a disk access protocol.

Storage operating system 300 has additional software layers, such as cluster interconnect layer 334 for controlling the operation of the cluster interconnect link between filers A & B in FIG. 1. A failover monitor layer 332 controls the operation of failover monitor 400 (FIG. 4) as it collects and analyzes information received from its NFO modules 401a–n regarding the operation of the filer and hardware connected thereto. The failover monitor layer also controls storing such information in the NVRAM, storing a mirror image copy of the information in the NVRAM of its partner, and controlling other communications between filers A & B.

Bridging the network system and file system protocol layers in the storage operating system is a file system layer 330 that controls storage and retrieval of data in the RAID 4 array of disks in each disk shelf. This includes a countdown timer 336 that is used to time a period in which a failed filer must gracefully shutdown before its partner forcefully takes over its file service operations.

In an alternate embodiment of the invention, some functions performed by the storage operating system may be implemented as logic circuitry embodied within a field programmable gate array (FPGA) or an application specific integrated circuit (ASIC). This type of hardware implementation increases the performance of the file service provided by a filer in response to a file system request issued by a client 110. Moreover, in another alternate embodiment of the invention, the processing elements of network and storage adapters may be configured to offload some or all of the packet processing and storage access operations, respectively, from the processor to thereby increase the performance of the file service provided by the filer.

Figure 4:
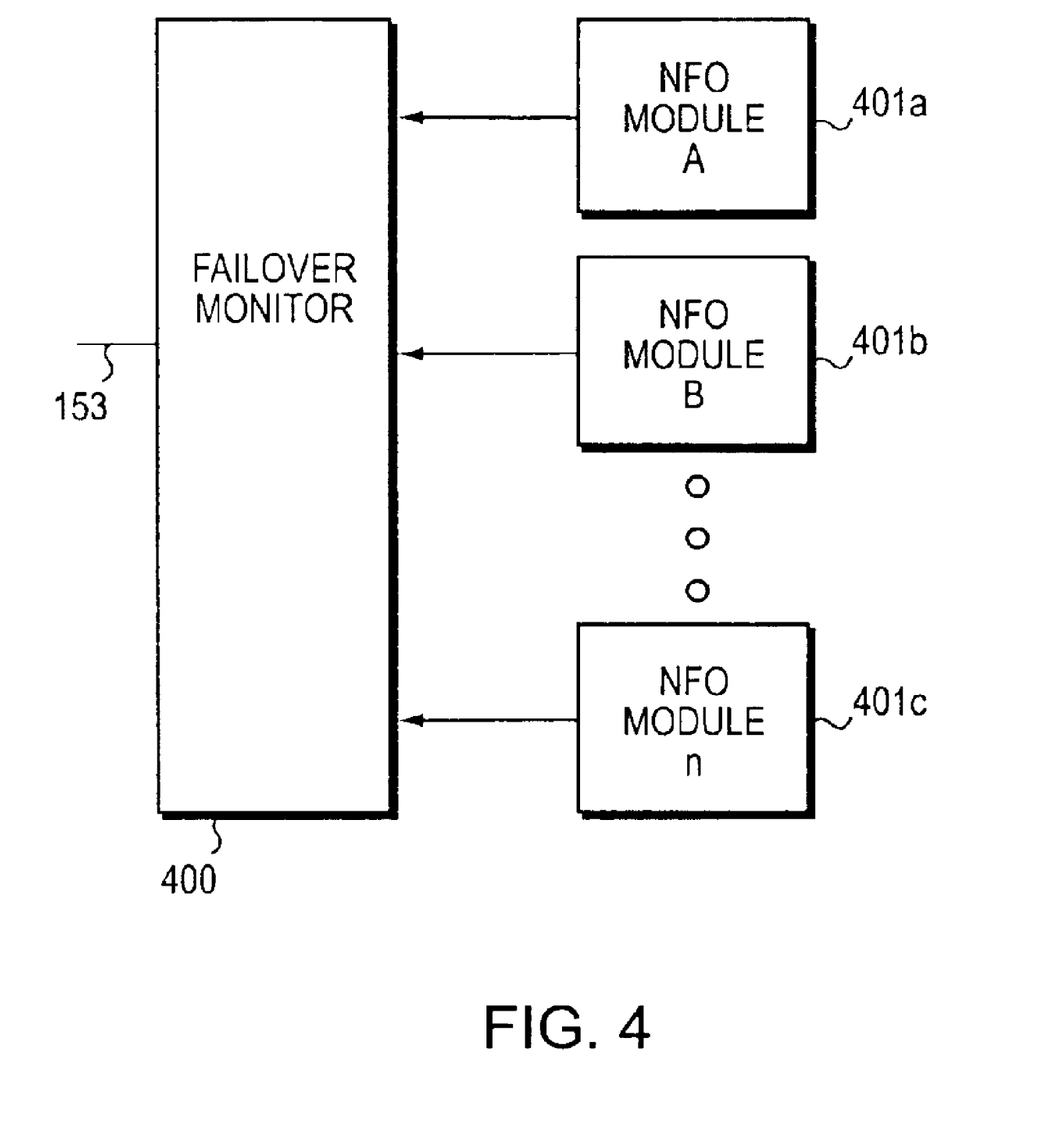
FIG. 4 is a block diagram of a failover monitor and modules that monitor various operations of a filer.

FIG. 4 is a block diagram of a failover monitor 400 and a plurality of NFO modules 401a-401n that monitor the operations of a filer and associated equipment with which the filer works. The modules each monitor a different aspect of the operation of a filer, and the failover monitor gathers the information from the individual modules to determine the operational health of the portions of the filer that are being monitored. Types of monitoring that are done include watching for failure of network adapters 208 and bad cabling. These types of failures are likely to be static and, once detected, persist until some kind of corrective action is manually taken. It should be understood that failover monitor 400 and modules 401a–401n may be implemented with hardware and/or software.

All the gathered information creates a "picture" of health of the filer that is stored in the NVRAM of both filers. Communications over the cluster interconnect are controlled by the failover monitor connected to either end of the cluster interconnect.

The following is a description of an orderly, graceful takeover of a failed filer by its partner filer without the intervention of a system operator. Once a filer ("failed filer") determines that it has a problem, the failed filer attempts to self diagnose the problem with its operation, and may also ask its partner filer to test whether it also has the same problem so as to determine if the problem can be attributed to something other than the failed filer. In addition, the partner filer investigates the problem, as requested by the failed filer, by attempting to accomplish what the failed filer indicates it cannot do. The goal of the cooperative testing is to confirm a problem with the operation of the failed filer through self-diagnosis or collective intelligence with the assistance of the partner filer.

In the event that a filer concludes that it is impaired it issues a "please takeover" request to its partner via the cluster interconnect, requesting that its file service operations be taken over by its partner. In addition, the failover monitor in the failed filer sends to its partner an indication of the type of failure detected. The partner first determines if it can take over the file services for the failed filer and, if it can, it issues a "please shutdown" command to the failed filer via the cluster interconnect link. If the partner cannot takeover and provide file services for the failed filer it does not issue the "please shutdown" command to the failed filer. The failed filer continues to send the "please takeover" command to its partner.

To provide time for the graceful shutdown, a countdown timer is started in the partner filer, and while the countdown timer is counting, the partner does not attempt to take over the operations of the failed filer. This countdown timer period varies at a set parameter or can be dynamically determined, depending on the nature of the trouble reported by the failed filer. At the end of the countdown period the partner determines if the failed filer has shut down. If the failed filer has shut down by completing existing file service requests, as detected by the partner filer receiving no "heartbeat" signals from the failed filer, the partner asserts "disk reservations" to take over responsibility of the disks of the failed filer. The graceful, negotiated takeover of the failed filer by its partner is thus completed.

In the event that the failed filer has not shut down at the end of the countdown period, the partner sends a "takeover" command to the failed filer, thereby forcing it to shutdown, asserts disk reservations, takes over responsibility of the disks of the failed filer, and takes over the services of the failed filer.

Once the failed filer has shut down, its partner takes over providing its file services. With the failed filer out of service, file service requests from clients are rerouted to and handled by the partner in the same manner as file service requests normally routed to it. As part of this takeover the partner takes on two identities: its own identity and the identity of the failed filer. In addition, the partner also activates network interfaces and network addresses that replicate the failed filer's network addresses. The identity and replicated network interfaces and network addresses are used by the partner until the failed filer is restored and control is returned to it.

In addition, to prevent the failed filer from coming back online of its own accord, the partner may, in some instances, periodically send a "please die" commands to the failed filer over the cluster interconnect to assure that it remains out of service.

This is a negotiated takeover between the filers that occurs in an orderly, graceful manner, without the need for operator intervention.

At a later time the failed filer is manually repaired and rebooted, or is just rebooted if the problem is a software failure and a reboot is all that is all that is necessary to restore it. If there is a problem with the failed filer that prevents it from being rebooted, or there is a problem with other equipment to which the failed filer is connected, the failed filer remains offline until the other problems are repaired. Rebooting first involves the restored filer issuing a "giveback command" to its partner, and includes restarting networking and file protocols. After reboot, control is returned to the restored filer and file service requests are rerouted to and serviced by it.

Figure 5:
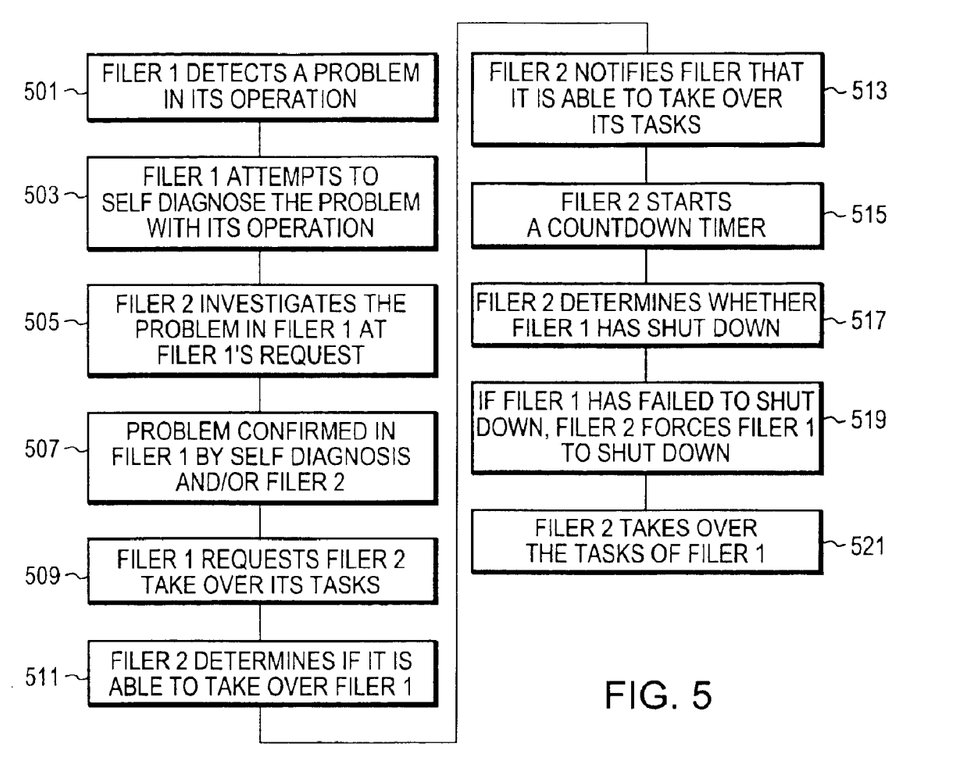
FIG. 5 is a flowchart illustrating the sequence of steps comprising a takeover of a failed filer in a cluster of filers.

In FIG. 5 is a flowchart illustrating the sequence of steps followed in performing a takeover of a failed filer by its partner filer in a cluster of filers.

At block 501 each of the clustered filers are initially monitoring their own operational states to detect a problem in their operation, and are storing their service logs in their NVRAM and in the NVRAM of their partner. Once a filer ("failed filer") determines that it has a problem, at block 503 the failed filer attempts to self diagnose the problem with its operation, and may also ask its partner filer to test whether it also has the same problem so as to determine if the problem can be attributed to something other than the failed filer. Examples of faults that can cause a fault determination are loss of shelf visibility, host adaptor failure, bad cabling, a network link being down, and an inaccessible hard drive on a disk shelf. As previously described, these determinations are made by the failover monitor in each filer.

In addition, at block 505 the partner filer investigates the problem, as requested by the failed filer, by attempting to accomplish what the failed filer indicates it cannot do. The goal of the cooperative testing is to confirm a problem with the operation of the failed filer through self-diagnosis or collective intelligence with the assistance of the partner filer, which it does at block 507.

At step 509 the failed filer requests that its partner filer takeover its operations and also indicates to its partner filer the type of problem(s) is has detected. At block 511, before the partner filer takes over the operations of the failed filer it first determines if it is able to do so.

If the partner filer is able to do so at block 511, at block 513 the partner filer issues a "please shutdown" command to the failed filer over the cluster interconnect, and starts a countdown timer block 515. During the period that the countdown timer is counting, the partner filer does not take over the operations of the failed filer to give it time to finish serving existing service requests while not accepting further service requests. This is a graceful shutdown and takeover by the partner filer.

At block 517 the partner filer determines if the failed filer has shutdown. In the event the failed filer shuts down before the end of the countdown period, as detected by the absence of a periodic "heartbeat" signal at the partner filer, the partner asserts disk reservations and takes over the file services of the failed filer. As previously described this involves the partner taking over the identity of the failed filer.

In the event that the failed filer has not completed its operations and shut itself down by the end of the countdown period, the partner filer forces the failed filer to shutdown at block 519 by issuing a "takeover" command and asserting disk reservations, thereby taking over responsibility of the disks of the failed filer, and providing the file services of the failed filer at block 521.

After detected problems are fixed, which may be as simple as rebooting of the failed filer, the identity and replicated network interfaces and network addresses used by the partner filer are discontinued and control is returned to the restored filer. The program then returns to step 501 where each filer provides file services, and is monitoring its own operations until an operational problem is again detected.

It will be apparent to those skilled in the art that other processing and memory means, including various computer readable media, may be used for storing programs and executing program instructions.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A method for use in a negotiated graceful takeover in a computer cluster having a first and second computer, the method comprising the steps of:
   detecting an operational fault at the first computer;
   requesting, from the first computer, in response to the operational fault, that the second computer take over for the first computer;
   requesting, from the second computer, that the first computer shut down;
   completing service requests at the first computer pending at the time the first computer was requested to shut down;
   transferring responsibilities of the first computer to the second computer; and
   shutting down the first computer.

2. The method as in claim 1, further comprising: monitoring, from the second computer, for any operational faults at the first computer.

3. The method as in claim 1, further comprising: diagnosing, at the first computer, the operational fault of the first computer.

4. The method as in claim 1, further comprising: requesting, from the first computer, that the second computer diagnose the operational fault of the first computer.

5. The method as in claim 1, further comprising: diagnosing, at the second computer, the operational fault of the first computer.

6. The method as in claim 1, further comprising: sending, from the first computer to the second computer, an indication of the type of operational fault detected at the first computer.

7. The method as in claim 1, further comprising: determining, at the second computer, if the second computer can take over for the first computer before requesting the shut down of the first computer.

8. The method as in claim 1, further comprising: refusing further service requests at the first computer after the first computer was requested to shut down.

9. The method as in claim 1, further comprising: transferring access of a storage device for the first computer to the second computer.

10. The method as in claim 1, further comprising: asserting, at the second computer, disk reservations of disks of the first computer.

11. The method as in claim 1, further comprising: rerouting file service requests from the first computer to the second computer.

12. The method as in claim 1, further comprising: activating, at the second computer, network interfaces and network addresses that replicate those of the first computer.

13. The method as in claim 1, further comprising: initiating a countdown timer subsequent to the shut down request from the second computer.

14. The method as in claim 13, further comprising: forcing the first computer to shut down in the event the first computer is still operating at the expiration of the countdown timer.

15. The method as in claim 1, further comprising: detecting, at the second computer, the shut down of the first computer by the absence of a periodic heartbeat signal.

16. The method as in claim 1, further comprising: storing, at the first computer, state information of the first computer prior to shutting down.

17. The method as in claim 1, further comprising: sending periodic requests from the second computer to the first computer to remain shut down, after the first computer has shut down.

18. The method as in claim 1, further comprising: requesting, from the first computer, that the second computer restore responsibilities of the first computer to the first computer.

19. The method as in claim 1, further comprising: restoring responsibilities of the first computer to the first computer upon restart of the first computer.

20. The method as in claim 1, further comprising: restoring responsibilities of the first computer to the first computer upon curing the operational fault of the first computer.

21. The method as in claim 1, further comprising: using the first and second computers as a file servers.

22. A storage system capable of performing a negotiated graceful takeover, the storage system comprising:
   a first computer;
   a second computer;
   a first processor for the first computer to
      i) detect an operational fault at the first computer, and
      ii) request, in response to the operational fault, that the second computer take over for the first computer, and
   a second processor for the second computer to
      i) request that the first computer shut down,
      ii) allow the first computer to complete service requests pending at the time the first computer was requested to shut down,
      iii) take over any responsibilities of the first computer, and
      iv) allow the first computer to shut down.

23. The storage system as in claim 22, further comprising: a failover monitor to monitor for any operational faults at the first computer.

24. The storage system as in claim 22, further comprising: the first processor to diagnose the operational fault of the first computer.

25. The storage system as in claim 22, further comprising: the first processor to request that the second computer diagnose the operational fault of the first computer.

26. The storage system as in claim 22, further comprising: the second processor to diagnose the operational fault of the first computer.

27. The storage system as in claim 22, further comprising: the first processor to send, to the second computer, an indication of the type of operational fault detected at the first computer.

28. The storage system as in claim 22, further comprising: the second processor to determine if the second computer can take over for the first computer before requesting the shut down of the first computer.

29. The storage system as in claim 22, further comprising: the first processor to refuse further service requests at the first computer after the first computer was requested to shut down.

30. The storage system as in claim 22, further comprising:
   a storage device for the first computer; and
   an interconnect to transfer access of the storage device for the first computer to the second computer.

31. The storage system as in claim 22, further comprising: disks of the first computer, the disks to be reserved by the second computer while the first computer is shut down.

32. The storage system as in claim 22, further comprising: an interconnect to reroute file service requests from the first computer to the second computer.

33. The storage system as in claim 22, further comprising:
   network interfaces at the first computer;
   network addresses at the first computer;
   network interfaces at the second computer that replicate the network interfaces of the first computer; and
   network addresses at the second computer that replicate the network interfaces of the first computer, the network interfaces and addresses at the second computer that replicate the network interfaces and addresses of the first computer to be activated by the second computer while the first computer is shut down.

34. The storage system as in claim 22, further comprising: a countdown timer, the countdown timer to be initiated subsequent to the shut down request from the second computer.

35. The storage system as in claim 34, further comprising: an interconnect to force the first computer to shut down in the event the first computer is still operating at the expiration of the countdown timer.

36. The storage system as in claim 22, further comprising: an interconnect at the second computer to detect the shut down of the first computer by the absence of a periodic heartbeat signal.

37. The storage system as in claim 22, further comprising: persistent memory at the first computer to store state information of the first computer prior to shutting down.

38. The storage system as in claim 22, further comprising: an interconnect at the second computer to send periodic requests to the first computer to remain shut down, after the first computer has shut down.

39. The storage system as in claim 22, further comprising: the first processor to request that the second computer restore responsibilities of the first computer to the first computer.

40. The storage system as in claim 22, further comprising: an interconnect to restore responsibilities of the first computer to the first computer upon restart of the first computer.

41. The storage system as in claim 22, further comprising: an interconnect to restore responsibilities of the first computer to the first computer upon curing the operational fault of the first computer.

42. The storage system as in claim 22, further comprising: the first and second computers are file servers.

43. A storage system capable of performing a negotiated graceful takeover, the storage system comprising:
   a first computer;
   a second computer;
   means for detecting an operational fault at the first computer;
   means for requesting, from the first computer, in response to the operational fault, that the second computer take over for the first computer;
   means for requesting, from the second computer, that the first computer shut down;
   means for completing service requests at the first computer pending at the time the first computer was requested to shut down;
   means for transferring responsibilities of the first computer to the second computer; and
   means for shutting down the first computer.

44. A computer readable media, comprising: the computer readable media containing instructions for execution in a processor for the method of,
   detecting an operational fault at a first computer;
   requesting, from the first computer, in response to the operational fault, that a second computer take over for the first computer;
   requesting, from the second computer, that the first computer shut down;
   completing service requests at the first computer pending at the time the first computer was requested to shut down;
   transferring responsibilities of the first computer to the second computer; and
   shutting down the first computer.

* * * * *